(12) United States Patent
Pearson

(10) Patent No.: US 12,031,944 B2
(45) Date of Patent: Jul. 9, 2024

(54) METHOD OF MANUFACTURE FOR AN ION MOBILITY FILTER

(71) Applicants: Owlstone Medical Limited, Cambridge (GB); Owlstone Inc., Westport, CT (US)

(72) Inventor: Jonathan Pearson, Cambridge (GB)

(73) Assignees: Owlstone Medical Limited, Cambridge (GB); Owlstone Inc., Westport, CT (US)

( * ) Notice: Subject to any disclaimer, the term of this patent is extended or adjusted under 35 U.S.C. 154(b) by 387 days.

(21) Appl. No.: 17/440,977

(22) PCT Filed: Mar. 20, 2020

(86) PCT No.: PCT/GB2020/050757
§ 371 (c)(1),
(2) Date: Sep. 20, 2021

(87) PCT Pub. No.: WO2020/188297
PCT Pub. Date: Sep. 24, 2020

(65) Prior Publication Data
US 2022/0163482 A1    May 26, 2022

(30) Foreign Application Priority Data
Mar. 21, 2019 (GB) .................................... 1903918

(51) Int. Cl.
*G01N 27/624* (2021.01)
*G01N 27/622* (2021.01)
*H01J 49/00* (2006.01)

(52) U.S. Cl.
CPC ......... *G01N 27/622* (2013.01); *G01N 27/624* (2013.01); *H01J 49/00* (2013.01)

(58) Field of Classification Search
CPC .... H01J 49/061; H01J 49/068; H01J 49/0018; G01N 27/622; G01N 27/624
See application file for complete search history.

(56) References Cited

U.S. PATENT DOCUMENTS

| 7,714,278 B2 | 5/2010 | Boyle et al. |
| 2008/0191132 A1 | 8/2008 | Boyle et al. |
| (Continued) | | |

FOREIGN PATENT DOCUMENTS

| GB | 2568480 A | 5/2019 |
| WO | 2019069089 A1 | 4/2019 |

OTHER PUBLICATIONS

Combined Search and Examination Report for related UK Patent Application No. GB1903918.9, mailed Sep. 6, 2019.
(Continued)

*Primary Examiner* — David E Smith
*Assistant Examiner* — Hsien C Tsai
(74) *Attorney, Agent, or Firm* — Leveque Intellectual Property Law, P.C.

(57) ABSTRACT

The present techniques relate to methods of manufacturing MEMS gas sensors, for example, an ion mobility filter which may be used as a field asymmetric ion mobility spectrometry filter. The method comprises a step of providing a support with an aperture (S300, S302) and forming electrical connections (S304) in the support. The method also comprises steps of attaching an electrode layer to the support (S306) so that the electrode layer covers the aperture and forming a plurality of ion mobility electrodes (S308) by mechanically dicing through the electrode layer. Each adjacent pair of electrodes defines an ion channel between them and each electrode is separate from the adjacent electrode(s).

23 Claims, 7 Drawing Sheets

(56) References Cited

U.S. PATENT DOCUMENTS

| | | | |
|---|---|---|---|
| 2011/0006196 A1* | 1/2011 | Boyle | G01N 27/624 250/281 |
| 2015/0028196 A1 | 1/2015 | Toutoungi et al. | |
| 2016/0336159 A1* | 11/2016 | Toutoungi | H01J 49/061 |

OTHER PUBLICATIONS

International Search Report and Written Opinion for related International Patent Application No. PCT/GB2020/050757, mailed Jul. 2, 2020.

* cited by examiner

METHOD OF MANUFACTURE FOR AN ION MOBILITY FILTER

CROSS-REFERENCE TO RELATED APPLICATIONS

This application is a National Stage Entry of International Patent Application No. PCT/GB2020/050757 (filed on Mar. 20, 2020), which claims priority to UK Patent Application No. 1903918.9 (filed on Mar. 21, 2019), the disclosures of which are incorporated herein by reference in their entireties.

TECHNICAL FIELD

The invention relates to a method of manufacturing a MEMS gas sensor, for example an ion mobility filter which may be used as a field asymmetric ion mobility spectrometry filter.

BACKGROUND

There are various types of MEMS sensors which can be used to analyse gas samples. Such sensors may comprise a gas flow path, e.g. a channel, which is configured to receive a flow of the gas sample. The gas flow path may be in a functional layer of the device and the functional layer may be made from a semiconductor or other conductive material. For example, ion mobility spectrometers are used to detect particular chemicals within gases such as air. Differential mobility spectrometry (DMS) which is also known as field-asymmetric waveform ion mobility spectrometry (FAIMS) is recognised as a powerful tool for separation and characterization of gas-phase ions.

There are various methods for manufacturing microelectromechanical systems (MEMS), for example bulk micromachining or surface micromachining. As an example, FIGS. 1a to 1c illustrate how a gas sensor such as an ion filter may be manufactured. As shown in FIGS. 1a and 1b, the ion filter 10 comprises an electrode layer 16 supported on a support layer 12. The electrode layer 16 comprises at least one ion channel 14 defined between a pair of positive and negative electrodes 15. The flow of ions from a sample through the ion channel is controlled by the application of a compensation field and a dispersion field in a known way. The ions which pass through the ion channel are detected by a detector and the resultant output can be analysed to determine the substances which are present in the sample.

The support layer 12 may be made from Pyrex® or a similar insulating material. The outer edge of the support layer 12 is contiguous with the outer edge of the electrode layer 16 and the support layer 12 is annular in the form of a generally rectangular frame. As schematically shown in dashed line in FIG. 1a, the inner edge of the support layer 12 defines an aperture which is at least partially aligned with the ion channel(s) 14 in the electrode layer 16 so that ions can flow through the aperture.

The method of manufacturing typically comprises bonding the support layer to the electrode layer and subsequently etching the electrode layer to define the electrode(s) and ion channel(s). As illustrated in FIG. 1b, the ion channel(s) formed during the etching process may be tapered which results in one end 18 of each ion channel being smaller than the opposed end of the channel depending on the direction of etching. It will be appreciated that the tapering has been exaggerated to illustrate the limitations. The tapering means that the reduction in the size at one end 18 increases with the depth D (or length) of the channel. Accordingly, the tapering effectively imposes a limitation in the aspect ratio (i.e. depth D to width W) of the channel that can be achieved. This limits the performance of the ion mobility filter in filtering ions of different mobilities because fewer ions will be able to travel through the tapering channel without contacting the electrodes. Accordingly, fewer ions will exit through the smaller exit.

As illustrated in FIG. 1c, a plurality of ion filters is typically formed on a single silicon wafer. Accordingly, the final step in the method is to separate the individual ion filters within the wafer. This is typically done by cutting or dicing the silicon wafer using a very thin and accurate saw, e.g. a water-cooled circular saw with diamond-tipped teeth.

Accordingly, the applicant has recognised the need for an alternative method of manufacturing an ion filter.

SUMMARY

According to the present invention there is provided methods and apparatus as set forth in the appended claims. Other features of the invention will be apparent from the dependent claims, and the description which follows.

We describe a method of manufacturing an ion mobility filter, the method comprising: providing a support comprising an aperture; attaching an electrode layer to the support so that the electrode layer covers the aperture; and forming a plurality of ion mobility electrodes by mechanically dicing through the electrode layer; wherein each adjacent pair of electrodes defines an ion channel between them and each electrode is separate from adjacent electrode(s). In other words, the two electrodes in each adjacent pair of electrodes are not in contact with each other, i.e. they are neither directly electrically connected nor physically connected to one another. In use, the aperture may be adapted to allow an ion filter gas to flow through the ion mobility filter.

We describe an ion mobility filter made according to the method. Mechanical dicing may be defined as the process by which separation between components is achieved. The dicing process may be a two stage process comprising scribing (i.e. introducing defect regions by scanning along cutting lines) and breaking (i.e. fracturing along the defect regions). The dicing process may be done by any suitable technique, e.g. mechanical sawing or laser cutting.

We also describe an ion mobility filter comprising a support comprising an aperture, and an electrode layer comprising a plurality of ion mobility electrodes with each adjacent pair of electrodes defining an ion channel therebetween and each electrode being separate from adjacent electrodes and from other electrodes in the plurality of ion mobility electrodes, wherein each ion mobility electrode spans the aperture and opposed ends of each ion mobility electrode are attached to the support.

By mechanically dicing the electrode layer, a plurality of channels each having an aspect ratio of at least 10:1 may be diced without loss of performance. Furthermore, the plurality of parallel channels may each have a width of between 10 and 50 microns. Such filters have a higher aspect ratio than prior art filters. Electrodes formed this way may also be more rigid and stable compared to known MEMS interdigitated ion mobility filter electrodes, for example because both ends are attached to the support. Thus, the electrodes may be less likely to shift over time thus mitigating against uneven ion channels and poor performance. The use of dicing also avoids the problems of tapering in the channels. Each ion channel may be defined between opposed parallel faces of adjacent electrodes.

The support may comprise a support layer, a first conductive layer on a first surface of the support layer and a second conductive layer on an opposed surface of the support layer. A plurality of electrical connections may be formed in the first conductive layer. The electrical connections may be in pairs, one at each end of an electrode. The electrical connections may be electrically isolated from each other whereby each electrode is electrically isolated from adjacent electrodes. For example, in addition to the dicing of the electrode layer, the method may comprise partially dicing the support when forming the plurality of ion mobility electrodes. This may assist in separating the electrical connections from each other. The electrical connections may connect non-adjacent electrodes together to form two or more electrode portions. For example, a first set of electrodes (for example every other electrode) may be connected to form a first electrode portion and the electrodes which interleave with (i.e. are between) the electrodes in the first set of electrodes may be connected to form a second electrode portion. The first electrode portion may be set to a positive potential and the second electrode portion may be set to a negative potential.

Electrical connections may be formed on the second conductive layer. Vias may be formed through the support layer to electrically connect the first and second conductive layers. The plurality of electrical connections and/or the vias may be formed before the forming of the plurality of ion mobility electrodes. The plurality of electrical connections and/or the vias may be formed by etching or may be formed by other suitable means, e.g. deposition.

The electrode layer may be between 1 and 10 microns thick. The electrode layer may be formed from any conductive material, e.g. metal or semiconducting material. Similarly, the first and second conductive layers may be formed from any conductive material, e.g. metal or semiconducting material. The support layer may be an insulating material, e.g. Pyrex®.

The method may comprise forming an aperture through the support before attaching the electrode layer. Alternatively, the support may be provided in the form of a frame. In this way, the aperture is pre-formed in the support before attaching the electrode layer. The size of the aperture may be selected to align the aperture with all of the ion channels or only with part of each ion channel.

The described ion filters may be incorporated in a spectrometry system and thus we also describe an ion mobility spectrometry system comprising: an ion filter as above; an ionizer for generating the ions with the gas sample; and a detector for detecting the output from the ion filter. The detector may comprise a detecting element, e.g. a pair of detector electrodes, for each ion channel where appropriate.

The system may comprise a processor configured to generate a graphical output for the at least one ion channel where appropriate. The graphical output may be based on information, e.g. ion current, which is detected by the detector. The processor may be configured to generate a measurement of ion current at the detector as a function of an applied dispersion field and an applied compensation field for each of the at least one ion channels.

The system may thus comprise a drive signal system for applying the dispersion field and the compensation field, e.g. as is well known in FAIMS. The drive signal system may be selected so as to apply a different electric field to the at least one ion channel. The drive signal system may be connected to the plurality of ion mobility electrodes and may be configured to control a potential for each of the plurality of ion mobility electrodes individually, i.e. may be configured to apply a different voltage to each electrode. The drive signal system may be configured to control the potential on each electrode in at least a first pair of electrodes to generate a first electric field within an ion channel between the at least one first pair of electrodes and to simultaneously control the potential on each electrode in at least a second pair of electrodes to generate a second electric field within an ion channel between the at least one second pair of electrodes, wherein the second electric field is different to the first electric field. The number of ion channels each having the first electric field may be selected to be between one and n−1 where n is the total number of ion channels. The number of ion channels may be selected to be between one and n−1 where n is the total number of ion channels. The drive signal system may be configured to control the potential on each electrode in additional pairs of electrodes to generate additional different electric fields. We also describe a method of detecting ions from a target chemical in a gas sample, the method comprising: ionizing the gas sample to create ions of the target chemical; filtering the ions through the ion filter described above; and detecting the ions that output from the filter using a detector. The method may further comprise creating a first electric field in a first ion channel defined between a first pair of electrodes in the plurality of electrodes and creating a different electric field in a second ion channel defined between a second pair of electrodes in the plurality of electrodes; whereby when filtering the gas sample a first portion of the plurality of ions of the target chemical pass through the first ion channel and a second portion of plurality of ions of the target chemical are absorbed by the second ion channel. The method may also incorporate the features described above in relation to the system.

It will also be appreciated that the method described above could be adapted to any type of MEMS gas sensor.

BRIEF DESCRIPTION OF THE DRAWINGS

For a better understanding of the invention, and to show how embodiments of the same may be carried into effect, reference will now be made, by way of example only, to the accompanying diagrammatic drawings in which:

FIG. 1c shows a silicon wafer incorporating several ion filters of FIG. 1a;

FIG. 4b is an example of an output from the system of FIG. 4a; and

DETAILED DESCRIPTION OF THE DRAWINGS

Figure 1A:
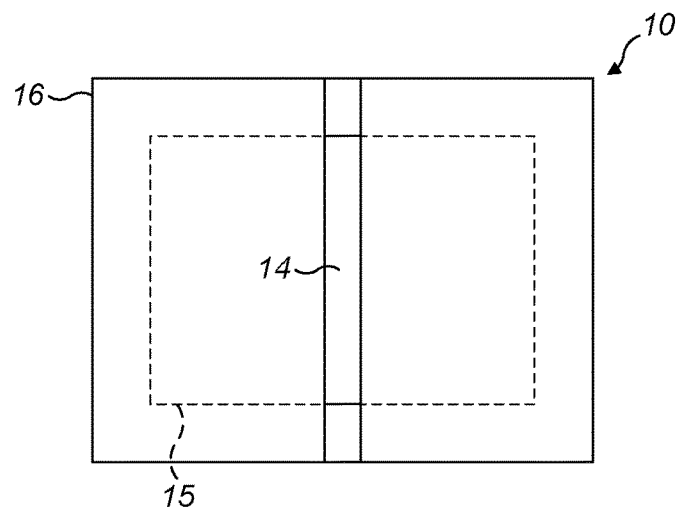
FIGS. 1a and 1b show plan and cross-section drawings of an ion filter manufactured using known methods.
Figure 1B:
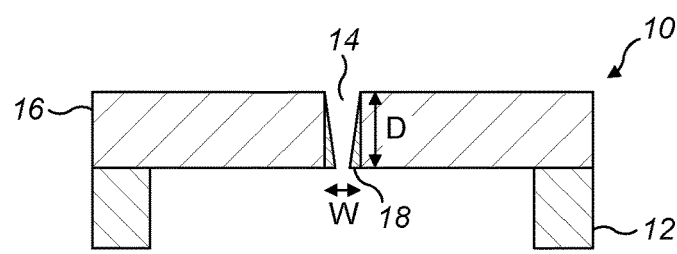
Figure 1C:
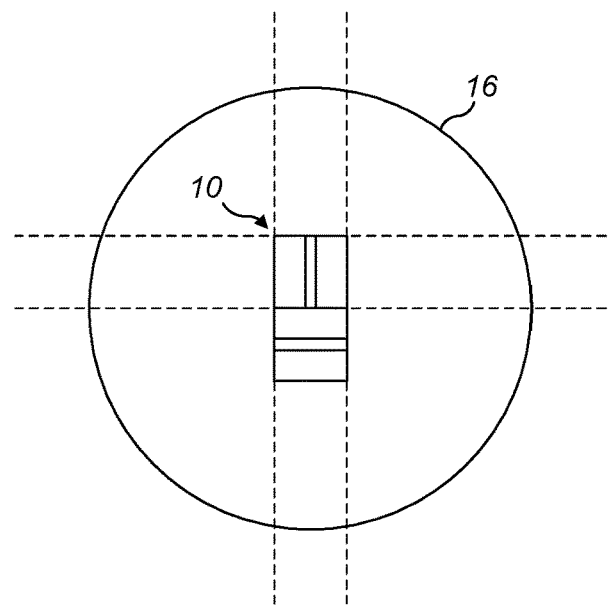

FIGS. 1a to 1c are described above in the background section.

Figure 2:
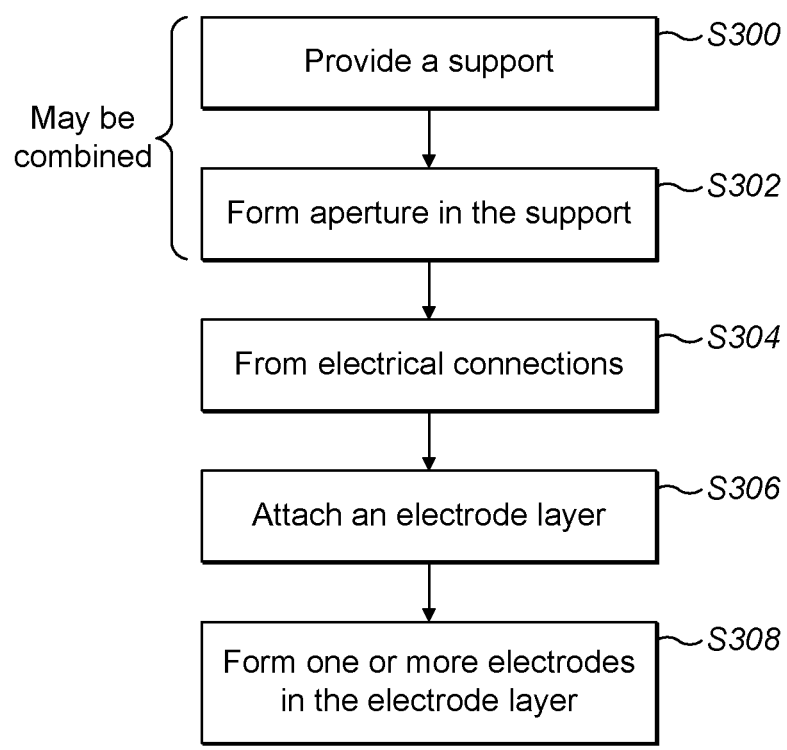
FIG. 2 is a flowchart of the steps of the manufacturing process.
Figure 3A:
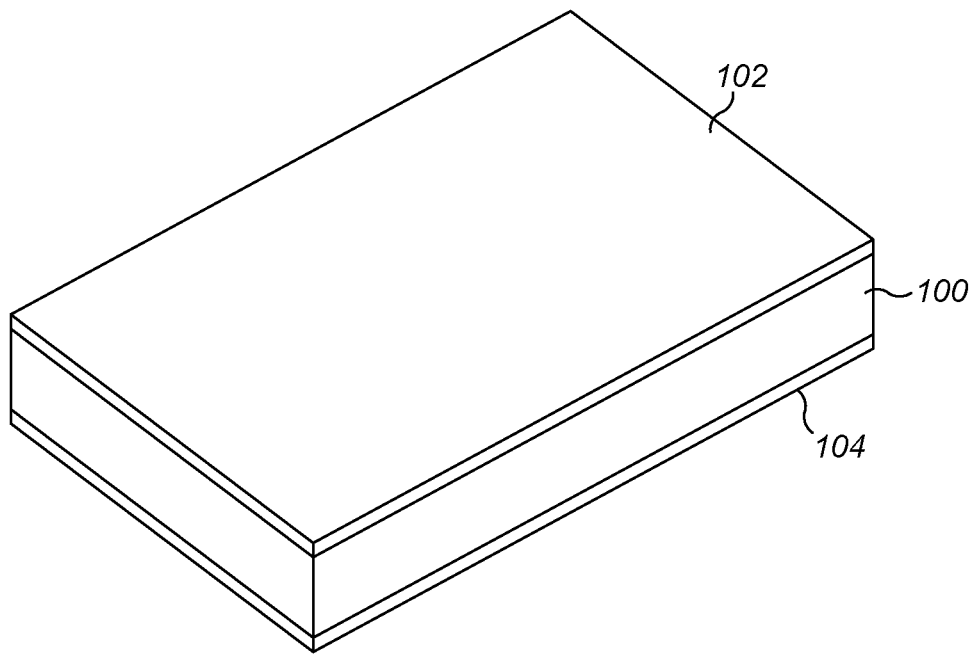
FIGS. 3a to 3e are schematic perspective views showing the stages in the manufacturing process of FIG. 2.

FIG. 2 is a flowchart showing the stages in a method of manufacturing an ion filter which addresses some of the disadvantages of the methods known in the art. FIGS. 3a to 3e show the various stages in the method of FIG. 2. In a first step S300 as shown in FIG. 2, a support is provided and this is illustrated in FIG. 3a. The support comprises an insulating layer 100 sandwiched between two conductive layers 102, 104 is provided. Each conductive layer 102, 104 may be bonded to opposed faces of the support layer 100 using standard techniques. The insulating layer 100 may be formed from Pyrex® or another insulating material and may be sufficiently thick and/or rigid to act as a support layer for the other components. The conductive layers 102, 104 may be formed of a semiconducting material and/or a metal. Each of the conductive layers 102, 104 may be between 1 to 10 micrometer thick.

Returning to FIG. 2, the second step S302 is to form an aperture through the support. The aperture 106 may be formed by etching, e.g. deep reactive ion etching (DRIE) and/or chemical etching or drilling. As an alternative to etching the aperture 106 in the support layer 100 after the bonding process, the aperture may be pre-formed in the insulating layer 100 before the insulating layer 100 is bonded to each conductive layer 102, 104. In this arrangement, each conductive layer 102, 104 may be frame-like with an aperture that aligns with the aperture in the insulating layer 100. Alternatively, the insulating layer 100 may be deposited on one conductive layer in the desired shape, e.g. frame-like with an aperture, and the second conductive layer also in the desired shape may then be bonded to the opposed face. It will be appreciated that steps S300 and S302 may be combined to a single step in which a support having an aperture is provided.

Figure 3B:
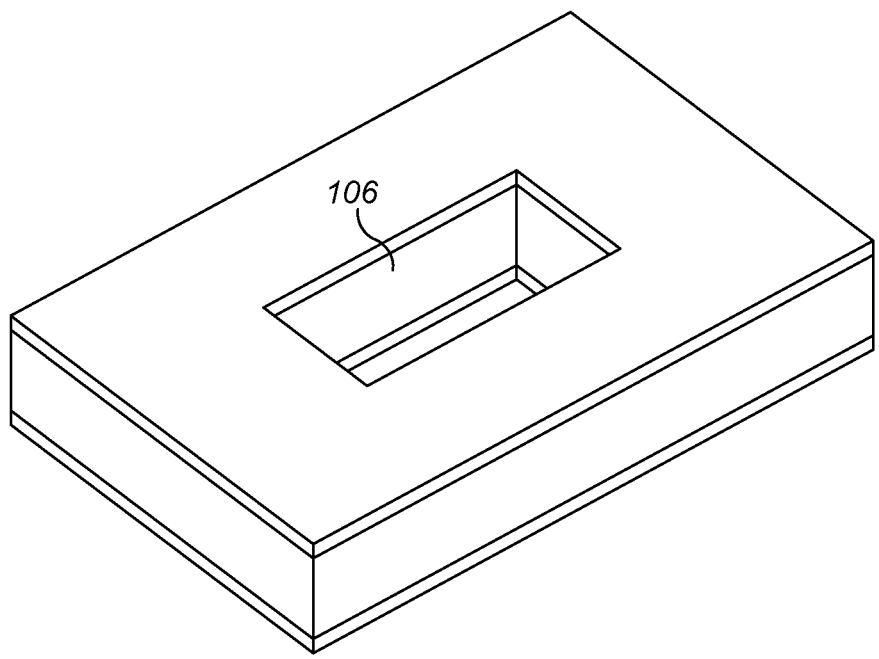

The result of the second step is illustrated in FIG. 3b which shows an aperture 106 formed through the insulating layer 100 and each of the two conductive layers 102, 104. As shown in this arrangement, the aperture 106 is centrally located.

Figure 3C:
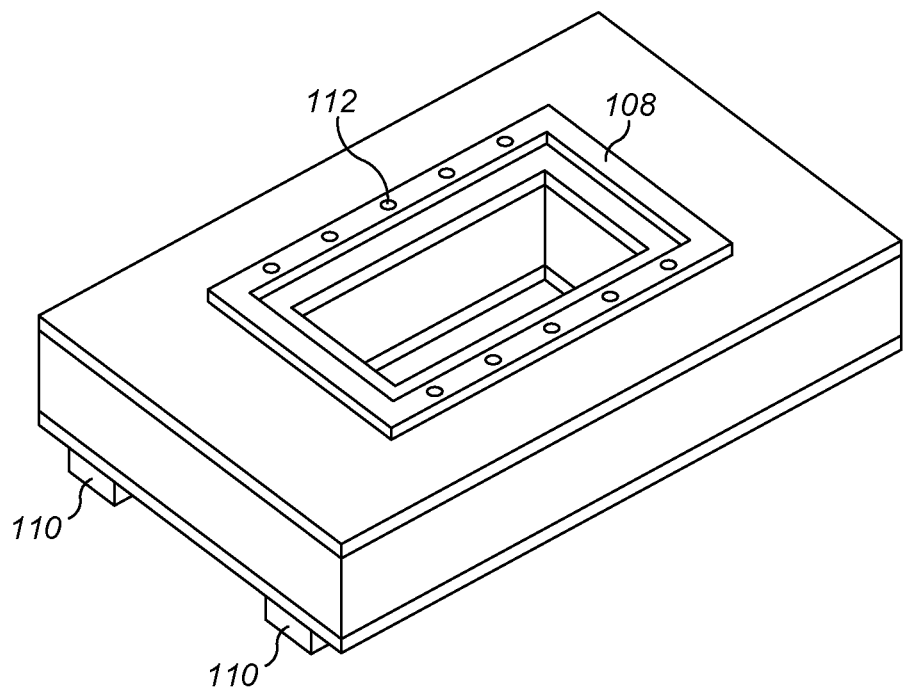

In a third step S304 shown in FIG. 2, the electrical connections are formed in the two conductive layers 102, 104. The electrical connections may be formed by etching, e.g. deep reactive ion etching (DRIE) In one conductive layer, the lower conductive layer as illustrated in FIG. 3c, electrode pads 110 are formed. The opposed conductive layer is etched to form a frame 108 around the aperture. A plurality of vias 112 are etched through the frame 108 to form a connection between each electrode pad 110 and the corresponding electrode which is yet to be formed. The vias 112 may be coated with gold.

Figure 3D:
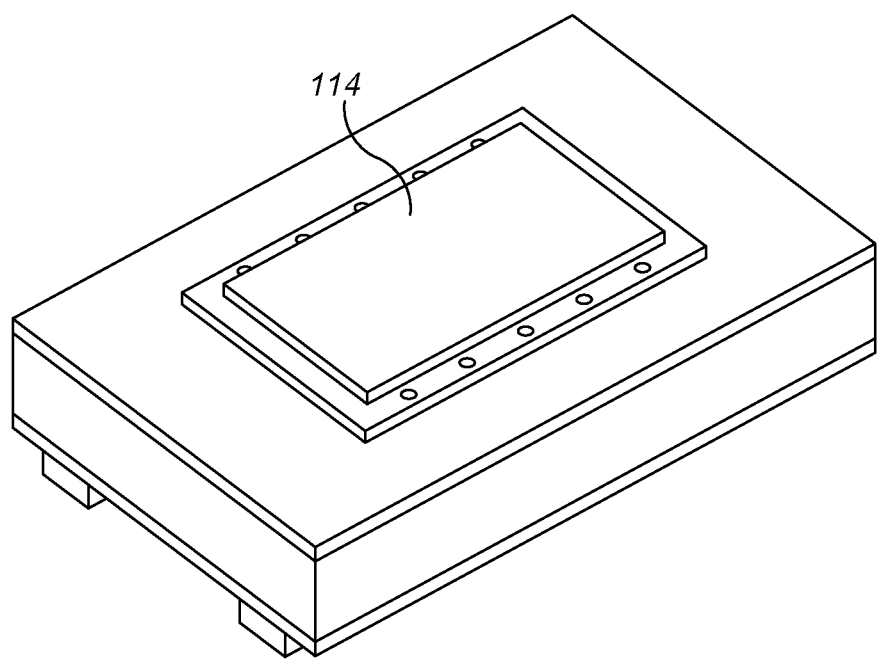

Returning to FIG. 2, the next step S306 is to attach an electrode layer 114 using any suitable attachment process, e.g. bonding. As shown in FIG. 3d, the electrode layer 114 extends over and covers the aperture. The electrode layer 114 also extends beyond the edges of the aperture and at least a portion of the electrode layer 114 (e.g. the portions adjacent the edges of the electrode layer) contact and hence overlap with at least part of the frame 108. The electrode layer 114 may be formed of a conductive material, e.g. a semiconducting material or a metal. The electrode layer 114 may be between 1 to 10 micrometer thick.

As shown in FIG. 2, the final step S308 is to form one or more electrodes in the electrode layer 114. In contrast to the previous steps, etching is not used and instead dicing is used to form the individual electrodes. It will be appreciated that it is important that the attaching step occurs before the dicing step. Otherwise, when the electrodes are physically separated from one another, they would effectively fall away from the device.

Figure 3E:
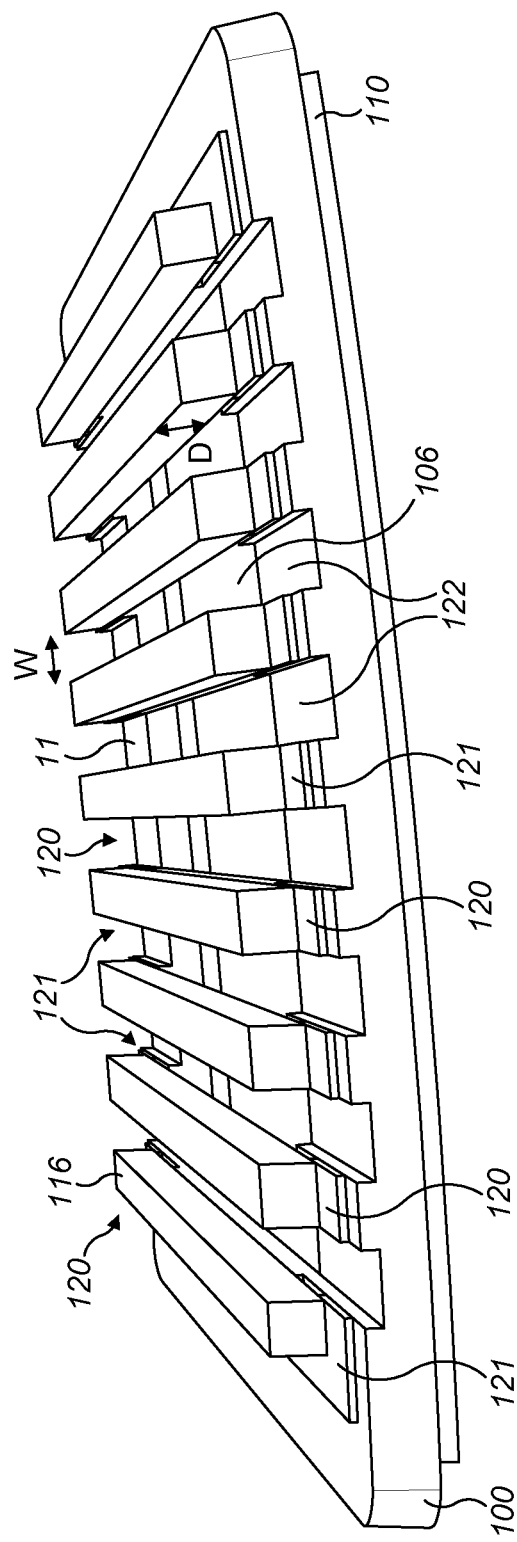

As illustrated in FIG. 3e, there is a plurality of individual electrodes 116 which are generally parallel to each other. An ion channel 11 is formed between adjacent pairs of electrodes 116 and thus there is also a plurality of parallel ion channels 11. To ensure that ions can pass through each ion channel 11 and through the aperture 106 to a detector, the dicing step dices all the way through the electrode layer to form the individual physically separated electrodes 116. As shown in FIG. 3e, the dicing layer may also dice through the conductive layer between the electrode layer and the support layer. This forms recesses 122 to separate each electrical connection 120 in the conductive layer. The recesses 122 may also partially extend into the support layer 100. The combination of the ion channels separating the electrodes and the use of separated electrical connections means that each electrode is effectively electrically isolated from the others.

FIG. 3e thus illustrates an ion filter formed by the method. The ion filter comprises a support layer 100 comprising an aperture 106. There is also an electrode layer comprising a plurality of parallel electrodes 116 separated by a plurality of ion channels 11. Each electrode is physically and mechanically separate from one other, i.e. there is no direct mechanical connection between the electrodes. Each ion channel 11 spans the aperture and has a depth D (may alternatively be termed length) and a width W. As an illustrative example, the width of each ion channel may be between 10 and 50 microns. The aspect ratio (i.e. depth to width ratio) of each ion channel may be at least 10:1. Using dicing as a method of forming the electrodes allows the creation of ion channels with such high aspect ratios.

Opposed ends of each of the electrodes 116 are mounted on electrical connections on the first conductive layer which is between the support layer 100 and the electrode layer. The electrical connections 120, 121 may be in pairs, one at each end of an electrode 116. Adjacent electrode connections are separated from one other to ensure that there is no electrical connection between electrodes. Vias extend from the electrical connections through the support layer 100 to electrode pads 110 in a second conductive layer on the opposed face of the support layer 100 to the first conductive layer. The electrode pads provide connections to a drive circuit (not shown) which sets the voltages of the electrodes. Each electrode is at a different potential to its adjacent electrode(s).

The potential of each electrode may be individually controllable. Ion channels are created between adjacent pairs of electrodes. By appropriate selection of the potential on each electrode in a pair of electrodes, different electrical fields may be created in each ion channel. For example, a first electric field may be created in a first ion channel and this electric field may be suitable for allowing ions to pass though the ion channel to a detector. A second electric field which is different to the first electric field may be created in a second ion channel which may be adjacent to the first ion channel. Alternatively, the electrodes may be connected to form groups of electrodes which are driven at the same potential. For example, a plurality of electrodes may be considered to form a first electrode portion and the electrodes adjacent to (or between) each of the electrodes in the first electrode portion may be considered to form a second electrode portion. The first electrode portion may be positive and the second electrode portion may be negative (or vice versa). In such an arrangement, each ion channel formed using the first and second electrode portions will have the same electric field. It will be appreciated that there may be multiple electrode portions to allow a fixed number of different electric fields.

In this illustrative arrangement, there are nine electrodes 116 and eight ion channels. For example, when all the channels have the same electric field, each of the first, third, fifth, seventh and ninth electrodes may form part of the first electrode portion and have a first electrical connection 121 at one end which is at the front of the device as shown and a second electrical connection 120 at the opposed end. The second, fourth, sixth and eight electrodes may form part of the second electrode portion and have the first electrical connection 121 at one end which is at the rear of the device as shown and the second electrical connection 120 at the opposed end. Thus, as shown the first electrical connections for each of the electrodes in the first electrode portion are interleaved with the second electrical connections for each of the electrodes in the second electrode portion and vice versa. Alternatively, each of the nine electrodes may have separate electrical connections 121 at one end and separate electrical connections 120 at the opposed end whereby the potential on each electrode is individually controllable. It will be appreciated that this is merely an illustrative arrangement and any number of channels and electrodes may be used as well as any electrical connections which achieve the required potentials on each electrode.

The ion filters described above may be incorporated into a spectrometry system, e.g. a field asymmetric ion mobility system (FAIMS). As shown schematically in FIG. 4a, the spectrometry system comprises a drive signal system 230 which sets the potential of each of the electrodes in the ion filter 200. The drive signal system 230 applies an oscillating electric field to each ion channel together with a DC voltage. The oscillating electric field comprises a variable high-voltage asymmetric waveform of low voltage pulse duration t(s) and high voltage pulse duration τ(s) and peak voltage $V_D$ is applied to create the variable field of $V_D/g$ (kVcm$^{-1}$). The mobility of each ion within the ion filter (also termed a separator) oscillates between a low-field mobility $K_0$ and a high-field mobility $K_E$ and the difference between the high-field mobility and low field mobility is termed ΔK. Ions of different chemicals will have different values of ΔK and the ions adopt a net longitudinal drift path length $(d_h-d_t)$ through the ion filter which is determined by their high and low field drift velocity ($v_{D(h)}$ and $v_{D(l)}$) and the high field and low field pulse durations. The DC voltage is a bias DC "tuning voltage" ($V_c$) which enables subtle adjustment of the peak voltage $V_D$ to counter the drift experienced by an ion of a specific ΔK. Only ions in a "balanced" condition will exit from each channel in the ion filter and be detected by the ion detector 210.

The output from the detector 210 is sent to a processor 220 which may be local (i.e. within the ion filter) or remote (i.e. in a separate computer/server). The processor is adapted to extract numerical parameters which facilitate chemical detection, identification, classification and/or quantification of the ions. For example, the processor may be configured to generate an output as shown in FIG. 4b in which the measurement of ion current at the detector is plotted as a function of the applied electric field resulting from the asymmetric waveform which is known as the dispersion field $E_D$ (kVcm$^{-1}$) and the applied electric field resulting from the DC voltage which is known as the compensation field $E_C$ (kVcm$^{-1}$). The spectral output may alternatively be presented as an m×n matrix of ion current measurements at m compensation field and n dispersion field settings. The graphs which are output from the processor can then be matched with known graphs collected under the same conditions to detect and identify a particular chemical.

Figure 4A:
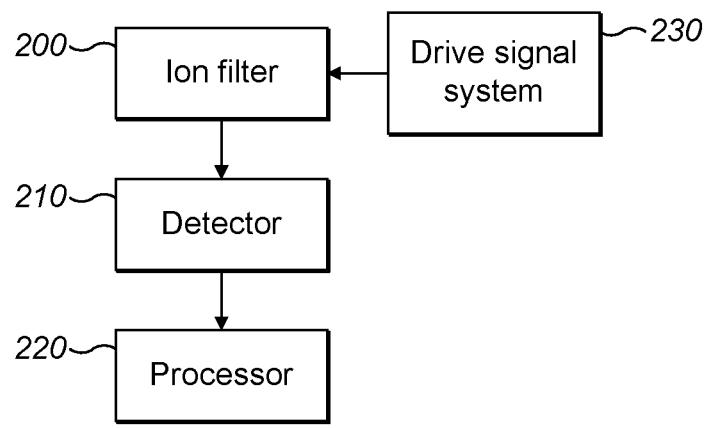
FIG. 4a is a schematic block diagram of a spectrometry system incorporating the ion filter of FIG. 2e.
Figure 4B:
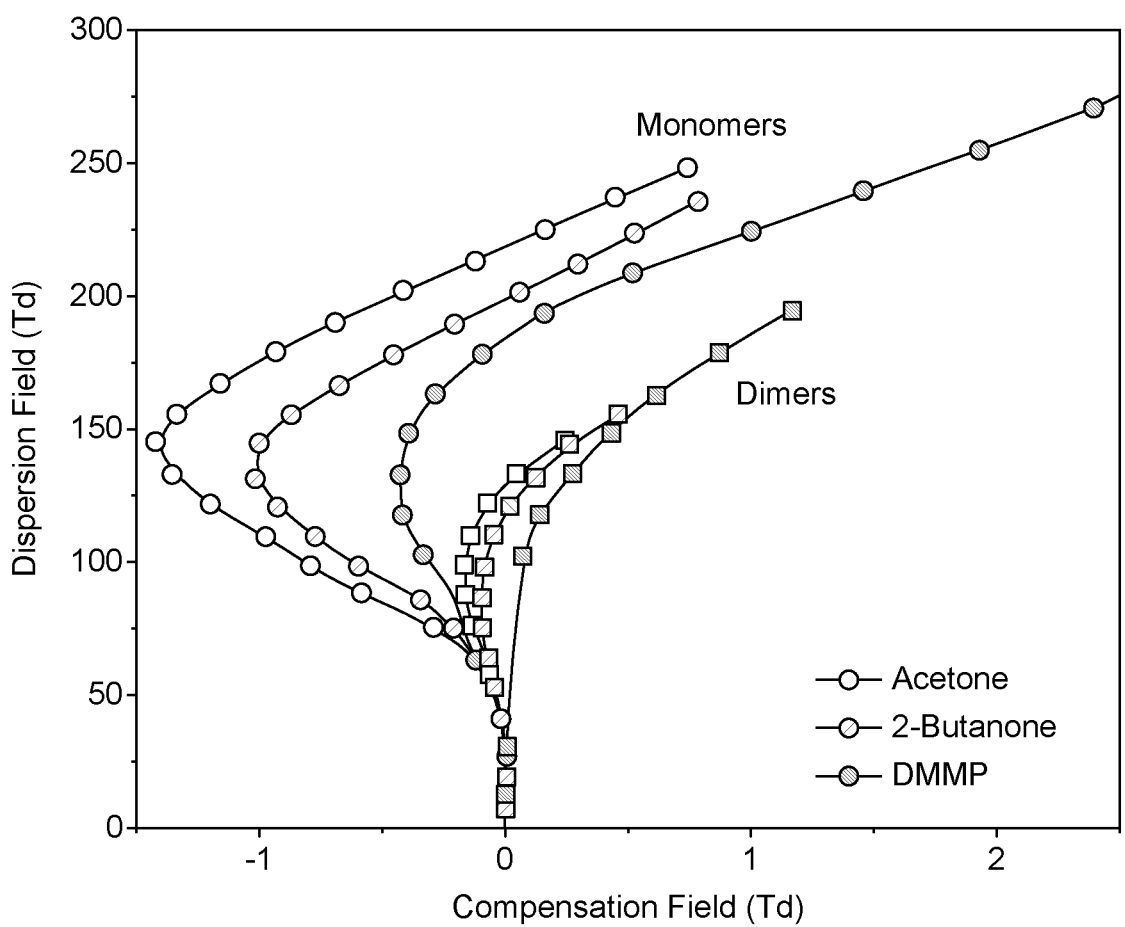
Figure 5:
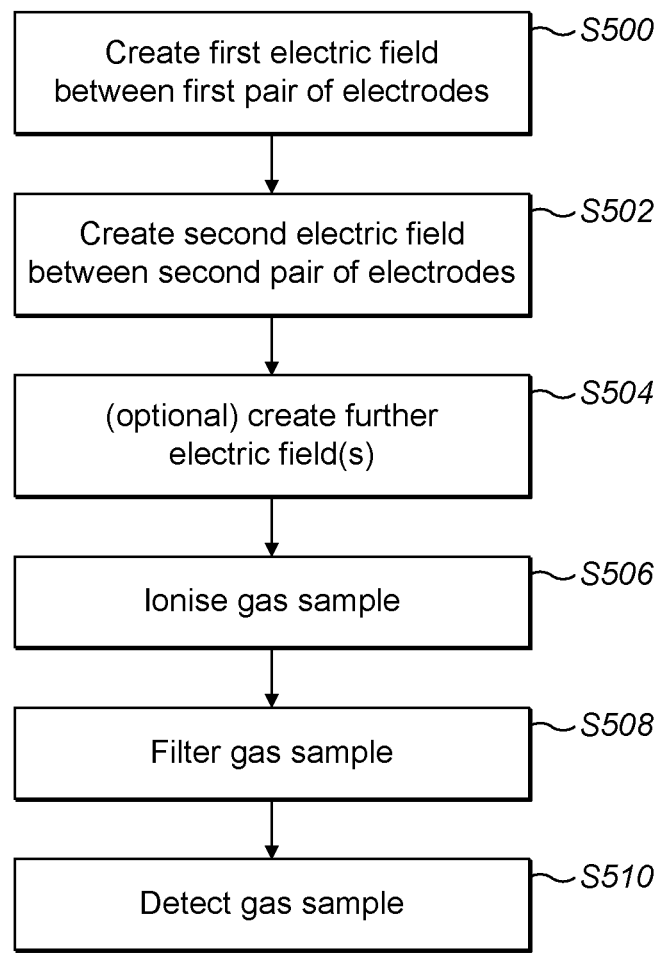
FIG. 5 shows a method of detecting ions in a gas sample using a spectrometry system.

FIG. 5 shows a method of detecting ions in a gas sample using the spectrometry system of FIG. 4a. This method is particularly suited to detecting ions when the concentration of ions is high enough to potentially saturate the detector. The system comprises a plurality of ion channels, where each of the plurality of ion channels is defined by a pair of electrodes. In step S500 a first electric field is created in at least a first ion channel. This electric field is suitable for allowing ions to pass through the ion channel to the detector and may be created in a selected number of ion channels, e.g. between one and n−1 channels where n is the number of channels. In step S502, a second electric field, different to the first electric field, is simultaneously created in at least a second ion channel by applying a different combination of voltages to the electrodes forming the second ion channel(s). This electrical field may be created in the remaining ion channels which are not at the first electric field.

Alternatively, as shown in the optional step S504, further different electrical fields may be created in some of the remaining ion channels. For example, referring to the filter arrangement of FIG. 3e, a first electric field may be created between the first and second electrodes and between the eighth and ninth electrodes, a second electric field may be created between the second and third electrodes and between the seventh and eighth electrodes. A third electric field may be created between the remaining electrodes. It will be appreciated that this is merely illustrative of the arrangements that could be used.

In step S506, the ionizer ionizes the gas sample. In step S508, the ion filter filters the gas sample. Here, a first portion of the gas flow comprising the ions of interest (i.e. the ions for the target chemical) generated by the ionizer passes through the first ion channel and a second portion of the gas flow passes through the second ion channel. The first ion channel filters ions in the normal way but the electric field in the second ion channel prevents ions passing through the second ion channel. Using the second ion channel to stop ions passing through it enables the total number of ions exiting the ion filter to be reduced, therefore the number of ions detected by the detector in step S510 decreases. This is particularly useful in cases where the concentration of ions increases due to changing ambient concentration levels, to such an extent that could otherwise cause the detector signal to become saturated. It will be appreciated that the use of more electric fields may allow the concentration of ions to be further tuned. For example, some of the ions generated by the ionizer may pass through the first ion channel, but not through either the second ion channel and be partially absorbed by a third ion channel. In other words, some of the ion channels may be tuned to allow a reduced transmission of ions of interest rather than blocking them completely.

In this embodiment, the number of ion channels configured to enable ions to pass through to the detector may be varied between one and all the total number of ion channels present in the ion filter. The number may be varied according to a level of ion intensity measured by the detector, so that when the ion intensity reaches a pre-set threshold level, the drive signal system varies the number of ion channels enabled to allow ions to be fully or partially transmitted.

Although a few preferred embodiments of the present invention have been shown and described, it will be appreciated by those skilled in the art that various changes and modifications might be made without departing from the scope of the invention, as defined in the appended claims.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

The invention claimed is:

1. A method of manufacturing an ion mobility filter, the method comprising:
   providing a support comprising an aperture;
   attaching an electrode layer to the support so that the electrode layer covers the aperture; and
   after attaching the electrode layer to the support, forming a plurality of generally parallel individual ion mobility electrodes and a plurality of parallel ion channels by mechanically dicing a plurality of parallel channels through the electrode layer;
   wherein each adjacent pair of electrodes defines an ion channel between them and each electrode is separate from adjacent electrodes and each electrode spans the aperture with opposed ends of each ion mobility electrode being attached to the support.

2. The method of claim 1, wherein the plurality of parallel channels through the electrode layer each have a width of between 10 and 50 microns.

3. The method of claim 1, wherein the plurality of channels each have an aspect ratio of at least 10:1.

4. The method of claim 1, wherein providing the support comprises providing a support layer having a first conductive layer on a first surface of the support layer and a second conductive layer on an opposed surface of the support layer.

5. The method of claim 4, further comprising forming a plurality of electrical connections in the first conductive layer wherein the electrical connections are in pairs, one at each end of an electrode.

6. The method of claim 4, further comprising forming vias through the support layer to electrically connect the first and second conductive layers.

7. The method of claim 5, wherein the plurality of electrical connections and/or the vias are formed before the forming of the plurality of ion mobility electrodes.

8. The method of claim 7, further comprising etching the plurality of electrical connections and/or the vias.

9. The method of claim 1, further comprising partially dicing the support when forming the plurality of individual ion mobility electrodes.

10. The method of claim 1, further comprising forming the aperture through the support before attaching the electrode layer.

11. An ion mobility filter, comprising:
    a support comprising an aperture; and
    an electrode layer comprising a plurality of generally parallel individual ion mobility electrodes and a plurality of parallel ion channels with each adjacent pair of electrodes defining an ion channel therebetween and each electrode being separate from other electrodes in the plurality of ion mobility electrodes,
    wherein each ion mobility electrode spans the aperture and opposed ends of each ion mobility electrode are attached to the support.

12. The ion mobility filter of claim 11, wherein the width of each ion channel is between 10 and 50 microns.

13. The ion mobility filter of claim 11, wherein the aspect ratio of each ion channel is at least 10:1.

14. The ion mobility filter of claim 11, wherein the electrode layer is between 1 and 10 microns thick.

15. The ion mobility filter of claim 11, wherein the electrode layer is metal.

16. The ion mobility filter of claim 11, wherein the support comprises a support layer, a first conductive layer on a first surface of the support layer and a second conductive layer on an opposed surface of the support layer.

17. The ion mobility filter of claim 16, wherein at least one of the first conductive layer and the second conductive layer is formed of a semiconducting material.

18. The ion mobility filter of claim 16, further comprising a plurality of electrical connections in the first conductive layer wherein the electrical connections are in pairs, one at each end of an electrode.

19. The ion mobility filter of claim 16, further comprising vias through the support layer to electrically connect the first and second conductive layers.

20. An ion mobility spectrometry system, comprising:
    an ion filter of claim 1;
    an ionizer for generating the ions with the gas sample; and
    a detector for detecting the output from the ion filter.

21. An ion mobility spectrometry system according to claim 20, further comprising a drive signal system which is connected to the plurality of ion mobility electrodes and which is configured to control a potential for each of the plurality of ion mobility electrodes individually.

22. An ion mobility spectrometry system according to claim 21, wherein the drive signal system is configured to control the potential on each electrode in at least a first pair of electrodes to generate a first electric field within an ion channel between the at least one first pair of electrodes and to simultaneously control the potential on each electrode in at least a second pair of electrodes to generate a second electric field within an ion channel between the at least one second pair of electrodes, wherein the second electric field is different to the first electric field.

23. A method of detecting ions in a gas sample using the ion filter of claim 11, the method comprising:
    creating a first electric field in a first ion channel of the plurality of parallel ion channels, the first ion channel being defined between a first pair of electrodes in the plurality of generally parallel electrodes;
    creating a different electric field in a second ion channel of the plurality of ion channels, the first ion channel being defined between a second pair of electrodes in the plurality of generally parallel electrodes;
    ionising a gas sample to generate a plurality of ions of a target chemical within the gas sample;
    filtering the gas sample using the ion filter, whereby a first portion of the plurality of ions of the target chemical pass through the first ion channel and a second portion of plurality of ions of the target chemical are absorbed by the second ion channel; and
    detecting the plurality of ions of the target chemical which are output from the filter.

* * * * *